No. 741,254. PATENTED OCT. 13, 1903.
F. LAMBERT.
WATER METER.
APPLICATION FILED JUNE 16, 1902.
NO MODEL. 3 SHEETS—SHEET 1.

Attest:
Geo. H. Botts
Mabelle F. Lake

Inventor:
Frank Lambert
By Edith J. Griswold
Atty.

No. 741,254. PATENTED OCT. 13, 1903.
F. LAMBERT.
WATER METER.
APPLICATION FILED JUNE 16, 1902.
NO MODEL.
3 SHEETS—SHEET 2.

Attest:
Geo H Botts.
Mabelle F. Lake.

Inventor:
Frank Lambert
By Edith J. Griswold
Atty.

No. 741,254. PATENTED OCT. 13, 1903.
F. LAMBERT.
WATER METER.
APPLICATION FILED JUNE 16, 1902.
NO MODEL. 3 SHEETS—SHEET 3.

Attest:
Geo H Botts
Mabelle F. Lake

Inventor:
Frank Lambert
By Edith J. Griswold
Atty.

No. 741,254. Patented October 13, 1903.

UNITED STATES PATENT OFFICE.

FRANK LAMBERT, OF BROOKLYN, NEW YORK.

WATER-METER.

SPECIFICATION forming part of Letters Patent No. 741,254, dated October 13, 1903.

Application filed June 16, 1902. Serial No. 111,861. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and has for its object to provide a convenient and efficient device for closing one end of the meter against water-service pressure and also for holding the parts of the meter together, more particularly to hold a measuring-chamber in normal position in a pressure-casing under normal water-service pressure, but permitting the parts to be forced out of normal position without damage to the meter under supernormal internal pressure.

My improvements are preferably embodied either in a compact device complete in itself or connected directly to a part of the meter, such as the measuring-chamber or a section thereof, so that the said section forms a part of the device. In the description I will refer to the complete device, whether partially formed by a section of the chamber or not, as a "magazine," since it contains or stores the power to hold both itself and the parts of the meter in place, it being made effective or ineffective for this purpose by a slight variation in its height.

In the accompanying drawings different constructions of meters are shown having my invention applied thereto in different ways; but I do not limit myself to any special construction of meter, nor to any specific manner of carrying my invention into effect beyond what is set forth in the claims appended hereto.

Figure 1:
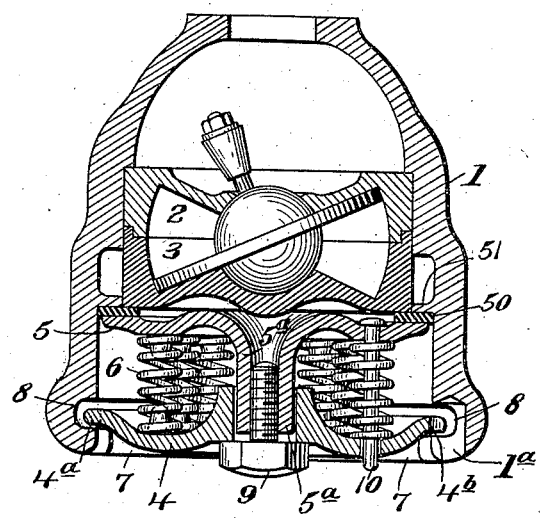
Figures 2, 3:
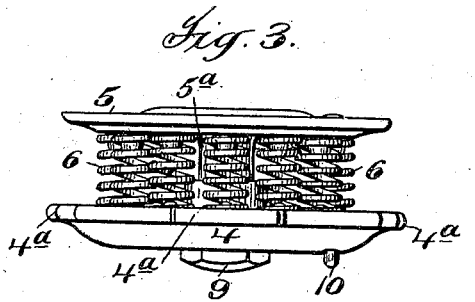
Figure 4:
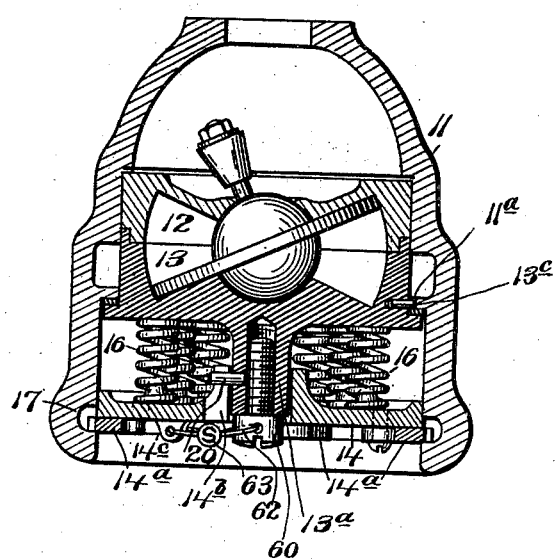
Figure 5:
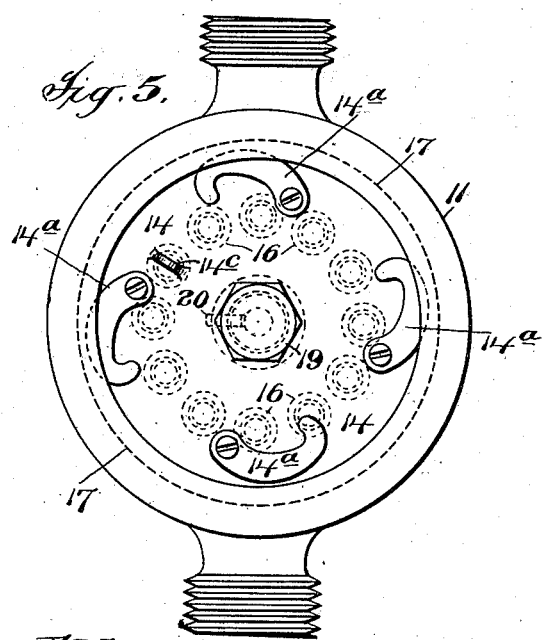
Figure 6:
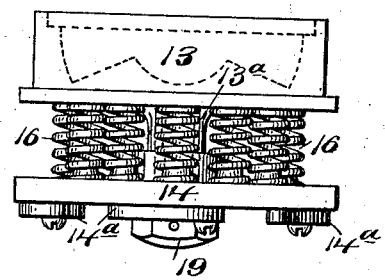
Figure 7:
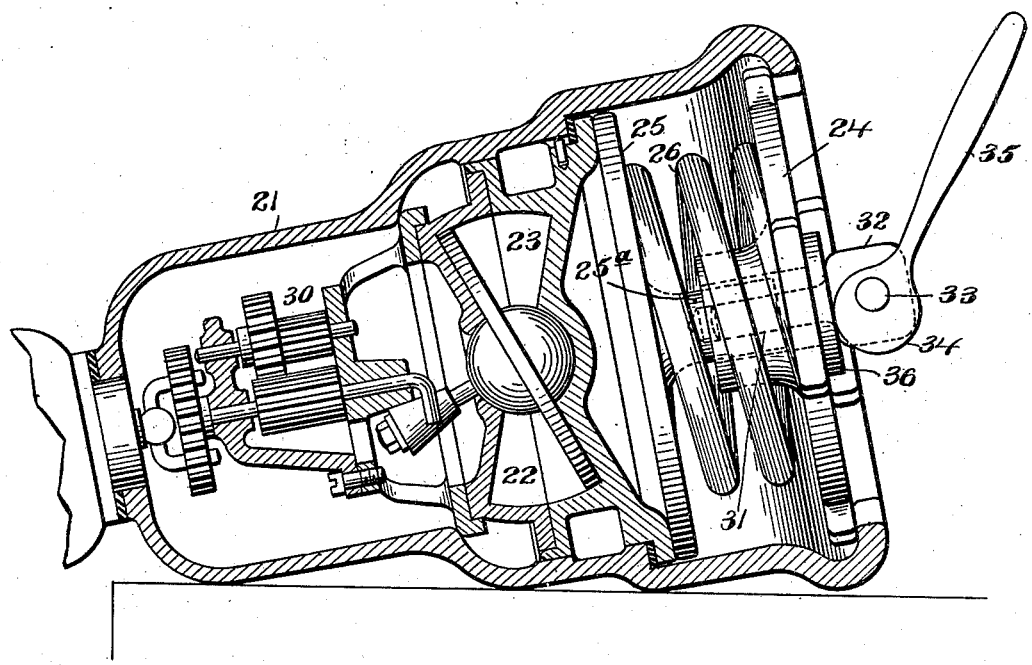
Figure 8:
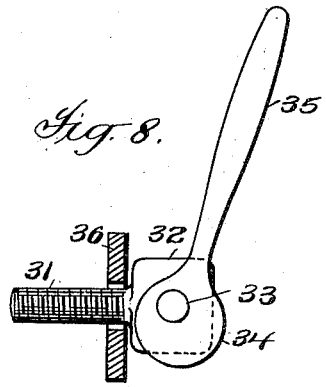

Figure 1 is a central sectional elevation of a meter, illustrating one application of my invention. Fig. 2 is bottom plan view of Fig. 1. Fig. 3 is a side view of the magazine shown in Fig. 1, taken out of the meter. Fig. 4 is a central sectional elevation of another construction of meter, illustrating another application of my invention and showing one feature of the magazine removed and a device in its place adapted to allow the closure of the meter to be sealed. Fig. 5 is a bottom plan view of Fig. 4, except that it represents the complete magazine shown in Fig. 6 before it is wholly in place and allowed to expand in the meter. Fig. 6 is a side view of the complete magazine, such as represented in Figs. 3 and 4, this being partially formed of a section of the measuring-chamber. Fig. 7 represents a central sectional view of a meter laid upon its side in a position in which the magazine may be conveniently operated, this figure showing a different form of spring in the magazine and a different device for contracting the magazine to render it ineffective or allow it to expand and become effective in the meter. Fig. 8 is a separate view of the device shown in Fig. 7 for changing the magazine.

Referring to Figs. 1 to 3 the external pressure-casing has a measuring-chamber 2 3 therein. This casing is closed against water-service pressure and the measuring-chamber held in normal position therein by means of the power-magazine. (Shown apart from the meter in Fig. 3.) This magazine comprises two elements—resilient means tending to force them apart and means for holding them together in opposition to the force tending to separate them—said means being capable of change to render the magazine effective to hold itself and the parts of the meter in place or ineffective to permit the meter being taken apart. With the construction shown in Figs. 1 to 3 the two elements consist of a brace-plate 4 and a thrust-plate 5, adapted to be inserted into the pressure-casing, and the resilient means consists of a plurality of springs 6. The plate 4 is provided with lugs $4^a$, capable of entering longitudinal grooves 7 in the casing until the lateral groove 8 is reached, when the magazine may be turned to carry the lugs $4^a$ beyond the grooves 7, (see Fig. 2,) so that the plate 4 is supported in the groove 8 in the casing. The means here shown for holding the plates 4 and 5 together consist of a screw 9, screwing into a threaded lug $5^a$ on the plate 5, which lug passes freely through a hole in the center of the plate 4, the head of the screw bearing against said plate 4, whereby the farther the screw 9 is screwed into lug $5^a$ the nearer the plates 4 and 5 will be drawn together. Before the parts of the meter are assembled the springs 6 of the power-magazine are compressed by drawing the plates 4 and 5 together, and the height of the magazine is made small enough to allow it to be readily inserted into its place in the meter-casing and turned to carry the lugs 4ª into their supporting position in groove 8, the springs being held in a state of compression, but firmly in place, so that the magazine may be handled with safety. Fig. 1 represents the magazine thus inserted in the casing 1, while the effect of the springs is virtually neutralized. It will be evident that if the screw 9 is now loosened or entirely removed, while the tension of the springs 6 is decreased, the springs at once become effective to force the brace-plate 4 against the bottom of the groove 8, to hold the magazine firmly in place, and to force the thrust-plate 5 upward against the packing 50 between said plate 5 and the measuring-chamber 2 3 and shoulder 51 in said casing. This closes the end of the casing and forces the measuring-chamber to its normal position against water-service pressure. Should the internal pressure become supernormal, the measuring-chamber or a section thereof and the thrust-plate 5 may be forced downward against the action of springs 6; but the brace-plate 4 will be maintained firmly in position. To remove the magazine, it is only necessary to turn screw 9 until the plates 4 and 5 are drawn together sufficiently to allow the plate 5 to be easily turned in groove 8, as shown in Fig. 1. It will be evident that only a fraction of a turn of the screw 9 will be sufficient to change the parts from a condition allowing the springs 6 to press with full force between the brace and the thrust-plate, and thus to hold the chamber in position to a condition allowing of the easy removal of the magazine. However, if desired, after the parts are assembled the screw 9 may be removed altogether, which would virtually leave the meter locked and prevent tampering with the internal part of the meter.

It may be desirable to provide means for preventing the plates 4 and 5 of the magazine from independent rotation, as might occur when screw 9 is turned, because of the friction between the plate 4 and the head of the screw. Such means may consist of a pin 10, carried by one of the plates, as 5, and passing freely through a hole in the other plate 4. Also the whole magazine may be prevented from rotating when the screw is tightened or lossened by inserting the point of a tool in the hole 1ª, which will engage in a notch 4ᵇ in the plate 4 and prevent its rotation.

Figs. 4, 5, and 6 represent a modification of my invention. In the magazine of this construction the lower section 13 of the measuring-chamber 12 13 is made to take the place of the thrust-plate 5, the springs 16 bearing between the brace 14 and said chamber-section. The brace 14 is drawn toward the chamber-section 13 by means of the screw 19, Figs. 5 and 6, threaded into a lug 13ª on the chamber-section, the head of the screw bearing against the brace 14 in opposition to the action of springs 16. As the chamber must have a registered position in the casing, here made by a pin 13ᶜ in the chamber entering a groove 11ª in the casing, with this modification it is preferable to make the brace 14 of a diameter that will enter the lower end of the casing in a direct line with the position it is to occupy—that is, so it will not be necessary to turn it (as the case with plate 4, Figs. 1 to 3) and to provide (in place of the lugs 4ª) pawls 14ª, pivoted to the bottom of the brace and adapted to be turned outward into the groove 17 of casing 11 to hold the brace 14 in place. Fig. 5 represents three of the pawls 14ª, turned into position in the groove 17 to hold the brace 14 in place, while the pawl 14ª at the lower side of the figure is shown as drawn inward, as all the pawls 14ª must be, to permit the removal or insertion of the magazine. In assembling or taking apart the brace 14 should be drawn close enough to the chamber-section 13 by screw 19 to easily swing the pawls 14ª in or out of the groove 17 when the magazine is inside of the casing. When the screw 19 is loosened, the springs 16 will thrust the pawls 14ª against the bottom wall of the groove 17 so firmly that neither the brace 14 nor the pawls can be moved accidentally. A pin 20, carried by the lug 13ª and working in a slot 14ᵇ in the brace 14, prevents independent rotation of the brace 14 and the chamber-section 13 when screw 19 is turned. Fig. 4 represents the magazine with the compressing-screw 19 removed and inserted in its place a screw 60, having a head small enough to enter the central hole in brace plate 14. This screw 60 serves to plug up the screw-hole in lug 13ª and prevent dirt clogging it when the meter is in use; but at the same time, because of its small head, it will not permit of drawing the elements 13 14 together to allow the meter to be opened. Also in order to indicate to the water department or other inspectors that the meter has not been tampered with the meter may be sealed, as shown, the screw 60 being provided with a hole 61 and the plate 14 being provided with a perforated lug 14ᶜ, so that a wire 62 may be passed through the perforation in lug 14ᶜ and through the hole 61 and sealed at 63. Thus unless the seal 63 is broken the screw 60 cannot be removed for the insertion of a device, such as screw 19, to further compress springs 16 and loosen the internal parts of the meter. It will be evident that the screw 19 may be sealed in the same manner.

Fig. 7 represents a meter in which the measuring-chamber 22 23 and the controlling-hub and gear-train frame 30 are all held in normal position by a power-magazine made according to my invention. This magazine is similar to that shown in Figs. 1 to 3; but instead of the compressed resilient force consisting of a plurality of springs a single spring 26, equal in strength to the series of springs 6 or 16, is used. In this figure I have shown another means for varying the tension of the resilient device to render the magazine effective or ineffective to hold the internal parts of the meter in place, which means when the meter is in service may be left in the magazine, as screw 9, Figs. 1 to 3, or may be removed for the purpose of leaving the meter locked or providing positive sealing means, such as shown in Fig. 4. Such a device can be used as a tool by the water department for the purpose of taking the meter apart and disconnected from the meter and kept by the department, the meter being sealed, if desired, as in Fig. 4. This device for operating the magazine—that is, for changing the tension of the resilient device—is shown separately in Fig. 8 and consists of a screw 31, to the head part 32 of which is pivoted at 33 a cam 34, provided with a handle 35 and a separate washer 36, passing freely onto the screw 31. It will be seen from Fig. 7 that if the screw 31 is screwed into the threaded lug 25ª until the washer 36 bears between the plate 24 and the cam 34, while the cam is turned with its smaller part against the washer, as shown, and then the handle 35 pressed downward (looking at Fig. 7) the cam will force this washer, and consequently the plate 24, nearer the plate 25 for loosening the magazine from the meter.

From the examples here shown it will be evident that with any proper construction embodying my invention of an expansion device and means for compressing and limiting the expansion of said device perfect safety will result for the operator who assembles or takes apart the meter, as the springs (or other expansion device) are never permitted to expand fully or suddenly while the magazine is being inserted or removed from the meter. A breakage of one or more of the springs cannot do any damage, as all the force will be confined between the thrust and brace plates, and the free insertion or removal of the magazine may depend simply upon a fraction of a turn of a screw, such as 9 or 19, to render the magazine effective or for neutralizing the effective power thereof.

I claim as my invention—

1. In a water-meter, a pressure-casing, a measuring-chamber therein formed of sections, a resilient device and means for holding it under various degrees of tension, said device adapted normally to maintain one of said chamber-sections in place in said casing under one tension but to be rendered incapable of this effect when said tension is increased.

2. In a water-meter, a pressure-casing, a measuring-chamber therein formed of sections, in combination with a spring adapted normally to maintain one of said chamber-sections in place in said casing under a certain tension and ineffective under a greater tension, and means for holding said spring under its effective or ineffective tension.

3. In a water-meter, a pressure-casing and a measuring-chamber, in combination with a spring for forcing said chamber to normal position in said casing, and means for compressing and holding said spring in a state of compression, said spring and said means capable of being bodily inserted into or removed from said meter while said spring is compressed by said means.

4. In a water-meter, a pressure-casing, a measuring-chamber formed in sections, and a power-magazine adapted to hold one of said sections in normal position in said casing, said magazine comprising two elements, a device tending to force them apart, and means for holding them together in opposition to the force of said device, said magazine being capable of ready insertion or withdrawal from said meter without permanently neutralizing the force of said device.

5. In a water-meter, a pressure-casing, a measuring-chamber formed in sections, and a power-magazine adapted to hold one of said chamber-sections in place in said casing, said magazine comprising two elements, a spring compressed between them, and means for holding them together in opposition to the force of said spring, said magazine being capable of ready insertion into or removal from said meter while said spring is maintained in a state of compression.

6. In a water-meter, a pressure-casing, a measuring-chamber formed in sections, and a power-magazine adapted to hold one of said sections in place in said casing, said magazine comprising two elements, a spring compressed between them, and means for holding the elements together in opposition to the force of said spring and to vary the compression of said spring, the magazine being capable of ready insertion into or removal from said meter when its spring is held by said means under one tension, but firmly maintained in its place in the meter when said spring is under a less tension.

7. In a water-meter, a pressure-casing, a device provided with a spring acting in opposition to the internal pressure, and means for compressing said spring and holding it under various tensions, said device adapted to hold itself in place and normally close one end of said casing when its spring is under a certain tension and being removable when its spring is under a greater tension produced by said compressing means.

8. In a water-meter, a pressure-casing, a device provided with a spring acting in opposition to the internal pressure, and means for compressing said spring and holding it under various tensions, said device adapted to hold itself in place and normally close one end of said casing when its spring is under a certain tension and being removable when its spring is under a greater tension, produced by said compressing means, part of said means being capable of withdrawal when the device is in place in said casing, to prevent compression for removal of the device.

In testimony whereof I have signed my name to this specification in the presence of two subscribing witnesses.

FRANK LAMBERT.

Witnesses:
MABELLE F. LAKE,
EDITH J. GRISWOLD.